(12) United States Patent
Kannan et al.

(10) Patent No.: US 9,973,671 B2
(45) Date of Patent: May 15, 2018

(54) METHOD AND APPARATUS FOR DIRECTING DATA CAPTURE DEVICES IN A MOBILE UNIT WITH A SINGLE OPERATION

(71) Applicant: SYMBOL TECHNOLOGIES, INC., Schaumburg, IL (US)

(72) Inventors: Anu Kannan, Astoria, NY (US); Konstantinos D Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 145 days.

(21) Appl. No.: 14/470,019

(22) Filed: Aug. 27, 2014

(65) Prior Publication Data

US 2016/0065819 A1  Mar. 3, 2016

(51) Int. Cl.
*H04N 5/225* (2006.01)
*G06K 7/00* (2006.01)
*G06K 7/10* (2006.01)

(52) U.S. Cl.
CPC ......... *H04N 5/2258* (2013.01); *G06K 7/0004* (2013.01); *G06K 7/1097* (2013.01); *G06K 7/10881* (2013.01); *H04N 5/2252* (2013.01)

(58) Field of Classification Search
CPC .................................................. H04N 5/2258
See application file for complete search history.

(56) References Cited

U.S. PATENT DOCUMENTS

| 4,411,016 A | 10/1983 | Wakeland |
| 4,538,072 A | 8/1985 | Immler et al. |
| 5,408,535 A | 4/1995 | Howard, III et al. |
| 5,600,121 A | 2/1997 | Kahn et al. |
| 5,880,451 A | 3/1999 | Smith et al. |
| 6,292,595 B1 | 9/2001 | Petteruti et al. |

(Continued)

FOREIGN PATENT DOCUMENTS

WO  2013050576 A2  4/2013

OTHER PUBLICATIONS

International Search Report and Written Opinion dated Oct. 26, 2015 in counterpart PCT application PCT/2015/042854.

(Continued)

*Primary Examiner* — Twyler L Haskins
*Assistant Examiner* — Dwight Alex C Tejano

(57) ABSTRACT

In a single operation executed by a mobile device, operation is executed on at least two data capture devices housed in the mobile device with a single trigger operation. The mobile device receives information captured by at least one of a first data capture device and a second data capture device; instructs adjustment of the other of the first data capture device and the second data capture device based on the received information and receives information captured by at least one of the first data capture device and the second data capture device subsequent to the adjustment. The mobile device analyzes the received information, repeats instructing adjustment until appropriated details are retrieved from the received information; and directs data capture and/or an image capture by at least one of the first data capture device and the second data capture device in accordance with the retrieved details.

20 Claims, 2 Drawing Sheets

(56) References Cited

U.S. PATENT DOCUMENTS

| | | | |
|---|---|---|---|
| 6,318,636 B1* | 11/2001 | Reynolds | G06K 7/0004 |
| | | | 235/472.01 |
| 6,690,883 B2* | 2/2004 | Pelletier | G03B 17/24 |
| | | | 348/231.5 |
| 6,940,556 B1* | 9/2005 | Tamune | H04N 5/2258 |
| | | | 348/223.1 |
| 7,325,737 B2 | 2/2008 | Epshteyn et al. | |
| 7,726,575 B2 | 6/2010 | Wang et al. | |
| 8,018,920 B1 | 10/2011 | Barkan | |
| 8,028,920 B2 | 10/2011 | Barkan | |
| 8,056,808 B2 | 11/2011 | Epshteyn | |
| 8,096,475 B2 | 1/2012 | Perera et al. | |
| 8,113,432 B2 | 2/2012 | Kimura et al. | |
| 8,120,696 B2 | 2/2012 | Jerdev | |
| 8,179,563 B2 | 5/2012 | King et al. | |
| 8,469,275 B2 | 6/2013 | Dahari | |
| 8,532,346 B2 | 9/2013 | Thorn | |
| 8,596,541 B2 | 12/2013 | Chiu et al. | |
| 8,964,062 B1* | 2/2015 | Neglur | H04N 5/235 |
| | | | 348/230.1 |
| 2003/0062418 A1 | 4/2003 | Barber et al. | |
| 2004/0246348 A1* | 12/2004 | Takeshita | H04N 9/735 |
| | | | 348/223.1 |
| 2005/0203846 A1 | 9/2005 | Noguchi | |
| 2006/0098245 A1 | 5/2006 | Park | |
| 2006/0187316 A1* | 8/2006 | Teramoto | H04N 5/2251 |
| | | | 348/231.3 |
| 2007/0051812 A1 | 3/2007 | Lopez et al. | |
| 2007/0103566 A1* | 5/2007 | Aerrabotu | H04N 1/00278 |
| | | | 348/231.3 |
| 2007/0229697 A1* | 10/2007 | Choi | H04N 5/2257 |
| | | | 348/345 |
| 2008/0128499 A1 | 6/2008 | Chen et al. | |
| 2009/0001171 A1 | 1/2009 | Carlson et al. | |
| 2009/0001173 A1 | 1/2009 | Sevier et al. | |
| 2009/0009626 A1* | 1/2009 | Ko | H04N 1/00251 |
| | | | 348/231.3 |
| 2009/0078774 A1 | 3/2009 | He | |
| 2009/0102936 A1* | 4/2009 | Muramatsu | H04N 5/232 |
| | | | 348/222.1 |
| 2009/0152358 A1 | 6/2009 | Epshteyn et al. | |
| 2010/0037184 A1 | 2/2010 | Sie | |
| 2010/0157280 A1 | 6/2010 | Kusevic et al. | |
| 2010/0231753 A1* | 9/2010 | Hagiwara | H04N 5/232 |
| | | | 348/231.6 |
| 2011/0068172 A1 | 3/2011 | Liu | |
| 2011/0169917 A1 | 7/2011 | Stephen et al. | |
| 2013/0063620 A1 | 3/2013 | Kim et al. | |
| 2013/0121546 A1 | 5/2013 | Guissin | |
| 2013/0201392 A1 | 8/2013 | Gutierrez | |
| 2014/0138441 A1 | 5/2014 | Davalos et al. | |
| 2014/0232904 A1* | 8/2014 | Na | H04N 5/23229 |
| | | | 348/239 |

OTHER PUBLICATIONS

International Search Report and Written Opinion in related application PCT/US2013/068682 dated Jul. 4, 2014.

* cited by examiner

METHOD AND APPARATUS FOR DIRECTING DATA CAPTURE DEVICES IN A MOBILE UNIT WITH A SINGLE OPERATION

BACKGROUND OF THE INVENTION

A conventional mobile unit may be configured with multiple data capture devices. For example, one data capture device may be a barcode scanner that may be positioned within a range of view so that when triggered, the barcode scanner may scan, capture, and subsequently decode a barcode. In another example, the data capture device may be a radio frequency identification (RFID) reader configured to receive a RFID signal from a RFID tag and capture the data encoded within the tag when the RFID reader is within a transmission range of the RFID tag. In another example, the data capture device may be a camera that is configured to capture an image or video within a field of view. Each of the data capture devices typically operates independently, wherein the scanner may capture and decode a barcode independent of the capturing of an image or video with the camera or the reading of an RFID tag with the RFID reader. Therefore, the user may have to individually and/or separately activate each data capture device as well as provide additional user interactions for each data capture device. There are times, however, when more than one data capture device may be directed to the same field of view or to proximately located or related fields of view. Rather than individually and/or separately activating each data capture device directed to the same field of view, there may be a need to coordinate the operations of the data capture devices.

Accordingly, there is a need for a method and apparatus for directing more than one data capture device in a mobile unit with a single operation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
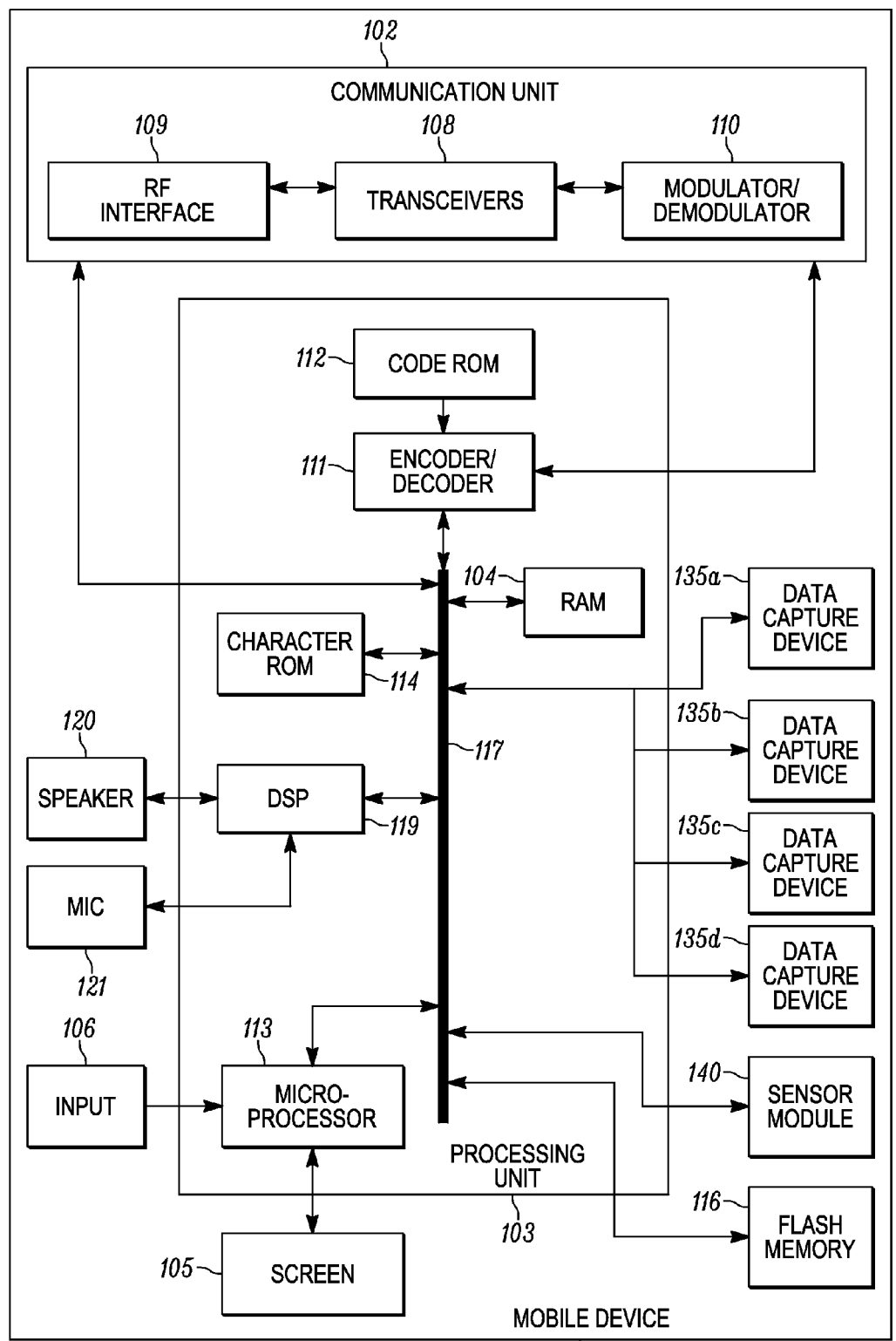
FIG. 1 is a block diagram of a mobile unit configured in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for directing more than one data capture device in a mobile unit with a single operation. In a single operation executed by a mobile device, a method includes executing operation on at least two data capture devices housed in the mobile device with a single trigger operation. The method further includes receiving information captured by at least one of a first data capture device and a second data capture device of the at least two data capture devices; instructing adjustment of the other of the first data capture device and the second data capture device based on the received information and receiving information captured by at least one of the first data capture device and the second data capture device subsequent to the adjustment. The method also includes analyzing the received information and repeating the instructing adjustment until appropriated details are retrieved from the received information; and directing at least one of data capture and an image capture by at least one of the first data capture device and the second data capture device in accordance with the retrieved details.

FIG. 1 is a block diagram of a mobile device 100 configured in accordance with some embodiments. Non-limiting examples of mobile device 100 may include a mobile radio, a mobile phone, a personal digital assistant, a smartphone, a tablet, a laptop, a barcode reader or any device including two or more data capture devices/modules that are capable of simultaneously capturing images or data. Mobile device 100, for example, may include a communications unit 102 coupled to a common data and address bus 117 of a processor 103. Mobile device 100 may also include an input unit (e.g., keypad, pointing device, etc.) 106, an output transducer unit (e.g., speaker) 120, an input transducer unit (e.g., a microphone) (MIC) 121, and a display screen 105, each coupled to be in communication with the processor 103. It should be noted that the mobile device 100 may include other components (not shown) such as a portable power supply (e.g., a battery). Mobile device 100 may further include one or more data capture devices 135 (i.e., data capture devices 135a-135d).

Processor 103 may include, that is, implement, an encoder/decoder 111 with an associated code read-only memory (ROM) 112 for storing data for encoding and decoding voice, data, control, or other signals that may be transmitted or received by mobile device 100. Processor 103 may further include one or more of a microprocessor 113 and digital signal processor (DSP) 119 coupled, by the common data and address bus 117, to the encoder/decoder 111, and to one or more memory devices, such as a character ROM 114, a random access memory (RAM) 104, and a flash memory 116. One or more of ROM 114, RAM 104 and flash memory 116 may be included as part of processor 103 or may be separate from, and coupled to, processor 103. The encoder/decoder 111 may be implemented by microprocessor 113 or DSP 119, or may each be implemented by a separate component of processor 103 and coupled to other components of the processor 103 via bus 117.

Communications unit 102 may include an RF interface 109 configurable to communicate with network components, and other user equipment within its communication range. Communications unit 102 may include one or more broadband and/or narrowband transceivers 108, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 102 may also include one or more local area network or personal area network transceivers perhaps operating in accordance with an IEEE 802.11 standard (e.g., 802.11a, 802.11b, 802.11g), or a Bluetooth transceiver. For any IEEE standards recited herein, contact the IEEE at IEEE, 445 Hoes Lane, PO Box 1331, Piscataway, N.J. 08855-1331, USA. The transceivers may be coupled to a combined modulator/demodulator 110 that is coupled to the encoder/decoder 111.

Figure 2:
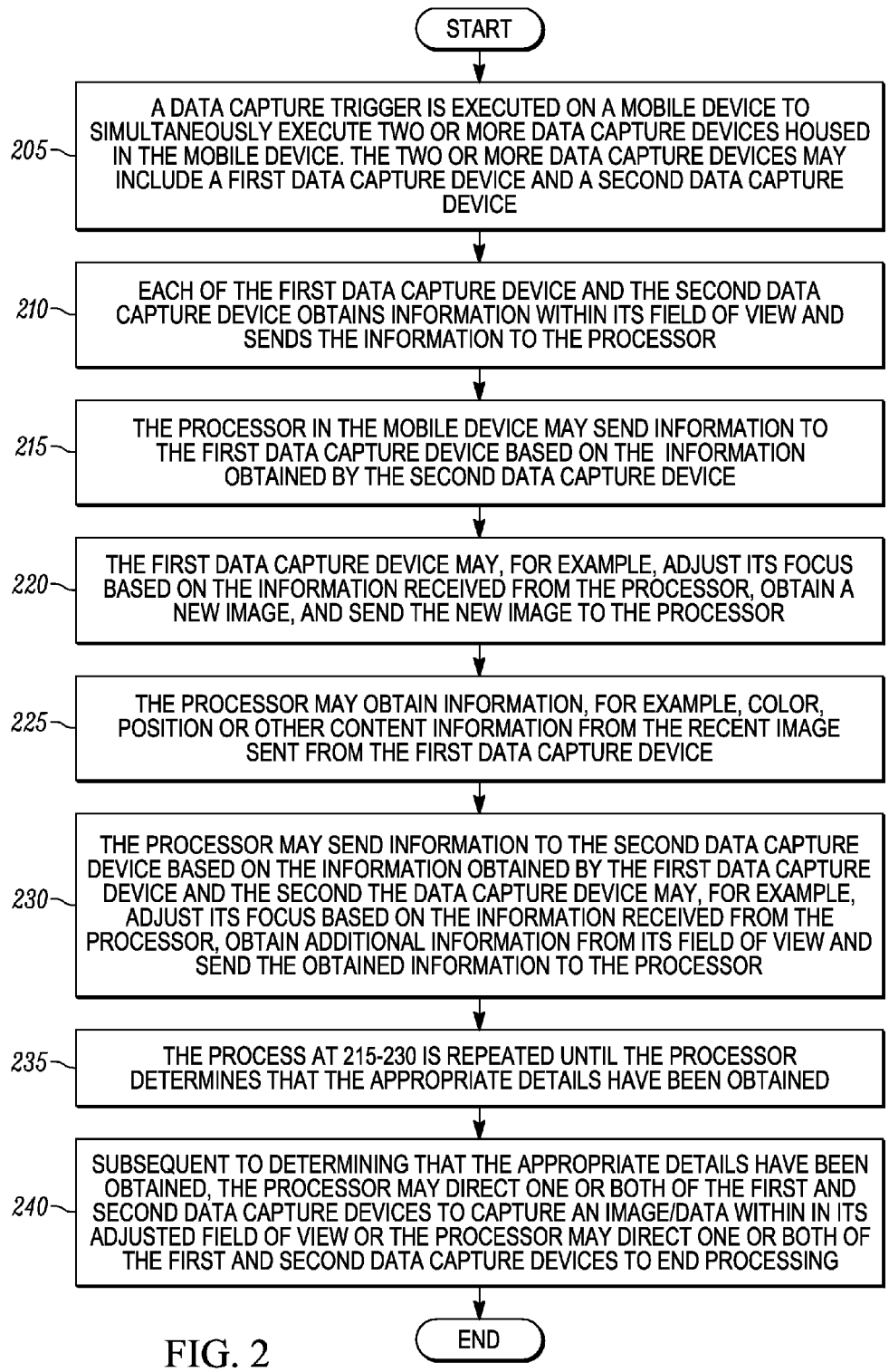
FIG. 2 is a flowchart of a method of used in accordance with some embodiments.

One or more memory devices 104, 112, 114, 116 may be configured to store code for decoding or encoding data such as control, request, or instruction messages, channel change messages, and/or data or voice messages that may be transmitted or received by mobile device 100 and other programs and instructions that, when executed by the processor 103, provide for the mobile device 100 to perform the functions and operations described herein as being performed by such a device, such as the implementation of the encoder/decoder 111 and one or more of the steps set forth in FIG. 2.

Each data capture device 135 may be any device that is configured to obtain data such as from a target device or area or from the environment in which mobile device 100 is disposed. For example, data capture device 135a may be a barcode scanner that is configured to capture data encoded in a 1-dimensional or 2-dimensional barcode. Accordingly, the barcode scanner may be disposed within the housing of the mobile device 100 with a field of view that can be oriented toward the barcode. Data capture device 135b may be an imager that is configured to capture an image of a target area. Accordingly, the imager may also be disposed within the housing of the mobile device 100 with a field of view that can be oriented toward the target area. Data capture device 135c may be a camera that may also be disposed within the housing of the mobile device 100. Data capture device 135d may be a RFID transceiver that is configured with a receiver to receive data encoded in a RFID tag. Data capture device 135d may also be disposed within the housing of mobile device 100 and may be configured to operate within an operating area so that when a RFID tag is within the operating area, the data encoded therein may be received.

Mobile device 100 may also include one or more sensor modules 140 that may be associated with one or more of the data capture devices 135 and that may be configured to determine and/or retrieve internally and/or externally related data. Non-limiting examples of externally related data may include location data, proximity data, motion data, orientation data, ambient light data, temperature data, and dimension data. That is, the externally related data may be external to mobile device 100. For example, the location data, the proximity data, the motion data, the orientation data, the ambient light data, and the temperature data, may relate to an external condition of mobile device 100 relative to an environment in which it is disposed. Non-limiting examples of internally related data may include position data or other data related to an internal condition of mobile device 100. The sensor module 140 may generate/capture the internally and/or externally related data in a variety of ways. For example, the sensor module 140 may continuously generate/capture the internally and/or externally related data (e.g., prior to, during or after a data capture function is activated). In a second example, the sensor module 140 may periodically generate/capture the internally and/or externally related data.

Mobile device 100 may be configured to simultaneously activate data capture functions on two or more data capture devices 135 with a single operation. For example, a user of mobile device may provide input data that relates to a request for two or more data capture devices 135 to be used to perform data capture operations. As discussed above, mobile device 100 may be configured with the I/O devices 105, 106, 120 and 121. In an example, mobile device 100 may simultaneously activate the data capture functions on two or more data capture devices 135 by, for example, touching the display device 105 or depressing a trigger (not shown) on the housing of mobile device 100. When the data capture functions on two or more data capture devices 135 are activated, processor 103 may perform further functions to direct operations on at least one of the activated data capture devices 135 based on information received from at least one other of the activated data capture devices 135.

Consider an example where an image to be simultaneously captured includes, for example, a barcode and data (for example, text, video or other graphical information, such as color). Consider also that the image may be captured simultaneously from data capture device 135c (described above to be a camera and referred to herein as camera 135c) and from data capture device 135a (described above to be a scanner and referred to herein as scanner 135a) in mobile unit 100. Camera 135c may have its own field of view and may capture an image in its field of view. Similarly, the scanner 135a may have its own field of view and may capture an image in its field of view. The fields of view of camera 135c and scanner 135a may be the same, proximately located or related in some manner.

By simultaneously directing two or more data capture devices in a single mobile device, the mobile device may be able to obtain more accurate data in a single operation. For example, in order to capture and read the data in the image, a high resolution image may be captured with camera 135c, wherein the image captured by camera 135c may include, for example, color information and/or depth information. In this example, in order to quickly capture and decode the barcode in the image, a low resolution image may be simultaneously captured with scanner 135a, wherein the image captured with scanner 135a is a typical black and white image that does not include, for example, the color information and/or depth information included in the image captured with camera 135c. Subsequent to receiving images and/or data captured by one or both of camera 135c and scanner 135a, processor 103 may analyze the received image and/or data to provide operational instructions to one or both of camera 135c and scanner 135a. For example, subsequent to receiving images and/or data captured by one or both of camera 135c and scanner 135a, processor 103 may direct one or both of camera 135c and scanner 135a to adjust the field of view of scanner 135a and/or camera 135c based on the received image and/or data. In another example, subsequent to receiving images and/or data captured by camera 135c, processor 103 may direct scanner 135a to adjust its field of view based on information retrieved camera 135c, and vice versa.

Consider also that there is a need to only capture and decode barcode information from a barcode associated with a given attribute, for example, a red background in a predefined location of the image. For example, consider that a barcode is to be scanned from a color coded airline tag or color coded conveyor belt systems in a warehouse. In this example, color information obtained from camera 135c may be fed back to scanner 135a in order for scanner 135a to scan only images associated with the red background. Accordingly, subsequent to capturing the image with camera 135c, processor 103 may, for example, retrieve the color from the predefined location in the image. Based on the retrieved color, processor 103 may direct scanner 135a to focus its field of view to the predefined location in the image if, for example, processor 103 determines that the predefined location includes a red background, and to capture a barcode in the location in the image with the red background. Processor 103 may direct scanner 135a to stop scanning if, for example, processor 103 determines that the predefined location includes a blue background.

In an embodiment, if the overlap between the fields of view of camera 135c and scanner 135a is relatively small, processor 103 may combine the fields of view of camera 135c and scanner 135a to obtain a relatively larger field of view for one or both of camera 135c and scanner 135a. In another embodiment, processor 103 may magnify the view. For example, during a scan operation when the scanner 135a is performing zooming action, based on information received from one or both of camera 135c and scanner 135a, processor 103 may direct the field of view of scanner 135a for close range, densely arranged barcodes and long range barcodes.

FIG. 2 is a flow diagram of steps implemented in accordance with some embodiments. At 205, a data capture trigger is executed on a mobile device to simultaneously execute two or more data capture devices housed in the mobile device. For example, simultaneous execution may include directing the fields of view of each of the two or more data capture devices to a same field of view, proximately located fields of view, and/or related fields of view. The two or more data capture devices may include a first data capture device and a second data capture device. At 210, each of the first data capture device and the second data capture device obtains information within its field of view and sends the information to the processor. For example, the first data capture device may obtain an image from its field of view and the second data capture device may determine a position of a barcode in its field of view. At 215, the processor in the mobile device may send information to the first data capture device based on the information obtained by the second data capture device. At 220, the first data capture device may, for example, adjust its focus based on the information received from the processor, obtain a new image, and send the new image to the processor. At 225, the processor may obtain information, for example, color, position or other content information from the recent image sent from the first data capture device. At 230, the processor may send information to the second data capture device based on the information obtained by the first data capture device and the second the data capture device may, for example, adjust its focus based on the information received from the processor, obtain additional information from its field of view and send the obtained information to the processor. At 235, the process at 215-230 is repeated until the processor determines that the appropriate details have been obtained.

At 240, subsequent to determining that the appropriate details have been obtained, the processor may direct one or both of the first and second data capture devices to capture an image/data within in its adjusted field of view or the processor may direct one or both of the first and second data capture devices to end processing. For example, if the processor determines, based on the information obtained from one or both of the first and second data capture devices, that the object associated with information received from one or both of the first and second data capture devices is an object from which an image should be retrieved, the processor may direct one or both of the first and second data capture devices to capture the image in its adjusted field of view. For example, the second data capture device may scan a barcode within its field of view and/or the first data capture device may capture an image within its field of view. If, on the other hand, the processor determines, based on the information obtained from one or both of the first and second data capture devices, that the object associated with information received from one or both of the first and second data capture devices is not an object from which an image should be retrieved, the processor may direct the one or both of the first and second data capture devices to end processing.

In an embodiment, the mobile device may be configured to display information retrieved by one or more of the data capture devices. In addition to directing data capture based on information provided by the data capture devices, the mobile device may also direct the data capture device(s) based on user interaction. For example, a view finder in a camera may be used to better target barcodes or data to be captured by a scanner, wherein by, for example, touching or aiming via the view finder of a camera, the user may trigger execution of an imager to capture and decode information. The display on the mobile device may therefore simultaneously improve the performance of the imager and the user interface. In another example, by interfacing with a display on the mobile device, a user of the mobile device may be able to verify and/or validate information, for example, barcode information being scanned by the scanner.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   in a single operation executed by a mobile device:
   simultaneously activating at least two data capture devices housed in the mobile device with a single trigger operation;
   receiving information captured by at least one of a first data capture device and a second data capture device of the at least two data capture devices;
   adjusting the other of the first data capture device and the second data capture device based on the received information and receiving information captured by at least one of the first data capture device and the second data capture device subsequent to the adjustment, wherein the adjusting includes modifying a field of view of the other of the first data capture device and the second data capture device;
   analyzing the received information and repeating the adjusting until appropriate details are retrieved from the received information; and
   directing at least one of data capture and an image capture by at least one of the first data capture device and the second data capture device in accordance with the retrieved details.

2. The method of claim 1, wherein the directing comprises directing at least one of the first data capture device and the second data capture device to capture at least one of data and the image within an adjusted field of view of at least one of the first data capture device and the second data capture device.

3. The method of claim 1, wherein the directing comprises directing at least one of the first data capture device and the second data capture device to end processing.

4. The method of claim 1, further comprising displaying retrieved information and directing at least one of the first data capture device and the second data capture device based on received user input.

5. The method of claim 1, wherein the activating comprises directing a field of view of each of the first data capture device and the second data capture device to at least one of a same field of view, proximately located fields of view, and related fields of view.

6. The method of claim 1, wherein the information captured by the each of the first data capture device and the second data capture device includes one or more of internally related data, externally related data, an image, a barcode, and contextual data associated with an image being captured by each of the first data capture device and the second data capture device.

7. The method of claim 1, wherein the at least two data capture devices include a camera and a scanner.

8. The method of claim 1, wherein the at least two data capture devices are activated to capture information associated with a specific object.

9. A mobile device for directing operations of at least two data capture devices in a single operation executed by the mobile device, the mobile device comprising:
   a housing in which the at least two data capture devices are located;
   a memory;
   a processor configured to implement functions comprising:
   simultaneously activating at least two data capture devices with a single trigger operation;
   receiving information captured by at least one of a first data capture device and a second data capture device of the at least two data capture devices;
   adjusting the other of the first data capture device and the second data capture device based on the received information and receiving information captured by at least one of the first data capture device and the second data capture device subsequent to the adjustment, wherein the adjusting includes modifying a field of view of the other of the first data capture device and the second data capture device;
   analyzing the received information and repeating the adjusting until appropriate details are retrieved from the received information; and directing at least one of data capture and an image capture by at least one of the first data capture device and the second data capture device in accordance with the retrieved details.

10. The mobile device of claim 9, wherein the directing comprises directing at least one of the first data capture device and the second data capture device to capture at least one of data and the image within an adjusted field of view of at least one of the first data capture device and the second data capture device.

11. The mobile device of claim 9, wherein the directing comprises directing at least one of the first data capture device and the second data capture device to end processing.

12. The mobile device of claim 9, further comprising a display for displaying retrieved information; and
wherein the processor is configured to direct at least one of the first data capture device and the second data capture device based on received user input.

13. The mobile device of claim 9, wherein the activating comprises directing a field of view of each of the first data capture device and the second data capture device to at least one of a same field of view, proximately located fields of view, and related fields of view.

14. The mobile device of claim 9, wherein the information captured by the each of the first data capture device and the second data capture device includes one or more of internally related data, externally related data, an image, a barcode, and contextual data associated with an image being captured by each of the first data capture device and the second data capture device.

15. The mobile device of claim 9, wherein the at least two data capture devices include a camera and a scanner.

16. The mobile device of claim 9, wherein the at least two data capture devices are activated to capture information associated with a specific object.

17. A method comprising:
in a single operation executed by a mobile device:
   simultaneously activating at least two data capture devices housed in the mobile device with a single trigger operation by directing a field of view of each of the first data capture device and the second data capture device;
   receiving information captured by at least one of a first data capture device and a second data capture device of the at least two data capture devices;
   adjusting the other of the first data capture device and the second data capture device based on the received information and receiving information captured by at least one of the first data capture device and the second data capture device subsequent to the adjustment, wherein the adjusting includes modifying a field of view of the other of the first data capture device and the second data capture device;
   analyzing the received information and repeating the adjusting until appropriate details are retrieved from the received information; and
   directing at least one of data capture and an image capture by at least one of the first data capture device and the second data capture device in accordance with the retrieved details.

18. The method of claim 17 wherein the field of view of each of the first data capture device and the second data capture device is at least one of a same field of view, proximately located fields of view, and related fields of view.

19. The method of claim 17 wherein modifying the field of view of the other of the first data capture device and the second data capture device is configured to capture information from a predefined location in an image of an object.

20. The method of claim 17 wherein the adjusting further includes adjusting a focus to obtain an image.

* * * * *